United States Patent

[11] 3,598,454

[72] Inventor William R. Richards
  Roseau, Minn.
[21] Appl. No. 827,839
[22] Filed May 26, 1969
[45] Patented Aug. 10, 1971
[73] Assignee Texotron Inc.
  Providence, R.I.

[54] VEHICLE DRIVE TRACK STIFFENER
  6 Claims, 10 Drawing Figs.
[52] U.S. Cl. .................................................. 305/35 R, 74/231
[51] Int. Cl. .................................................. B62d 55/24
[50] Field of Search .......................................... 305/35, 37, 38; 74/231, 237; 156/137; 198/192

[56] References Cited
UNITED STATES PATENTS

| | | | |
|---|---|---|---|
| 3,472,563 | 10/1969 | Irgens | 305/35 X E |
| 3,480,339 | 11/1969 | Kett | 305/35 EB |
| 3,508,796 | 4/1970 | Paulson | 305/38 |
| 2,899,242 | 8/1959 | Bombardier | 305/38 |
| 3,105,536 | 10/1963 | Cappa | 305/35 X EB |
| 3,311,152 | 3/1967 | Marzocchi | 305/357 |
| 3,464,743 | 9/1969 | Hallaman | 305/35 EB |

*Primary Examiner*—Richard J. Johnson
*Attorney*—Merchant & Gould

ABSTRACT: An endless molded rubber drive track or belt is disclosed having two rows of longitudinally spaced openings for engagement with the teeth of a pair of drive sprocket wheels. A plurality of stiffeners formed from unidirectional fiber glass are carried within the belt between the inner and outer surfaces thereof. Each stiffener extends substantially the full transverse width of the belt between adjacent openings to impart transverse rigidity to the belt.

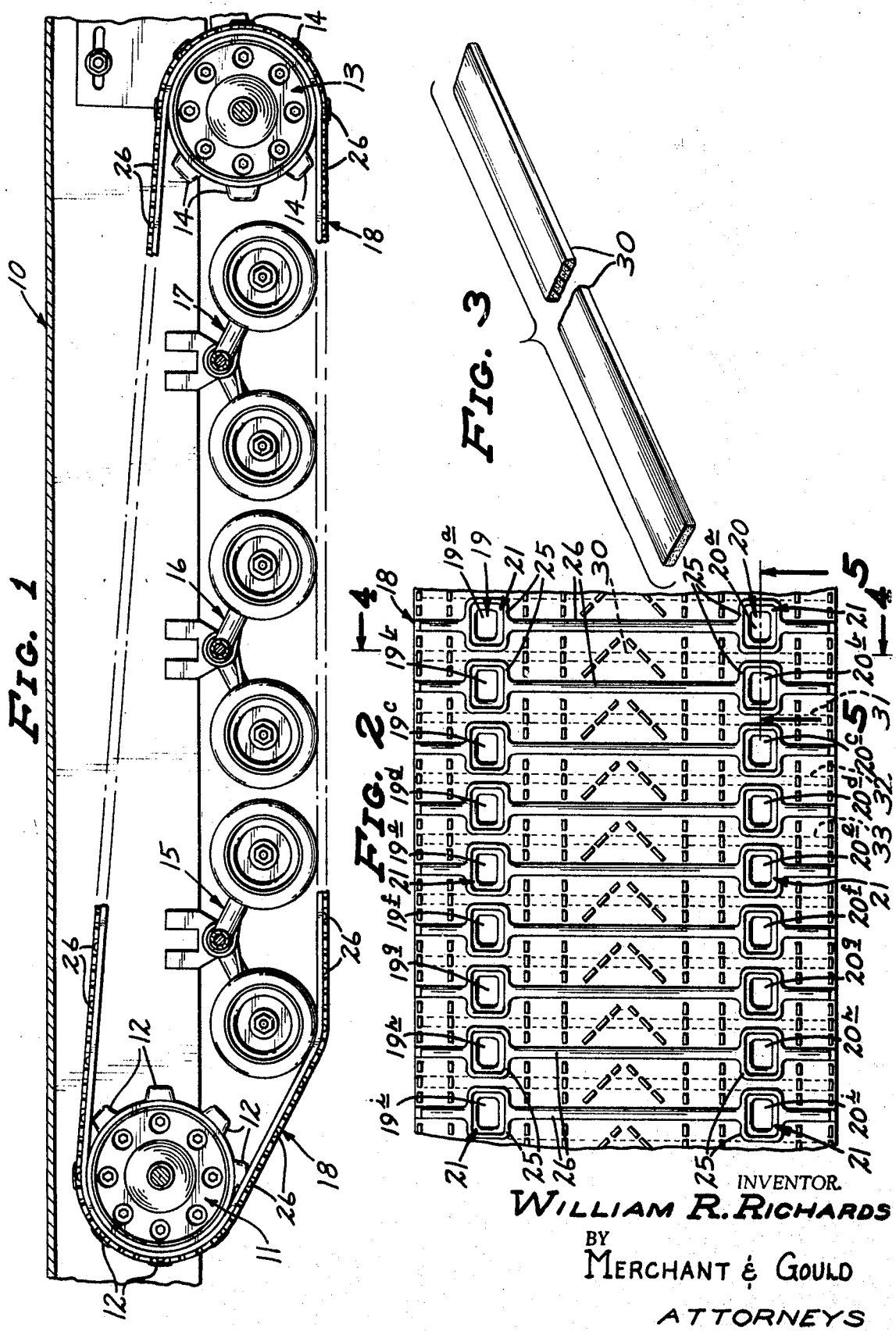

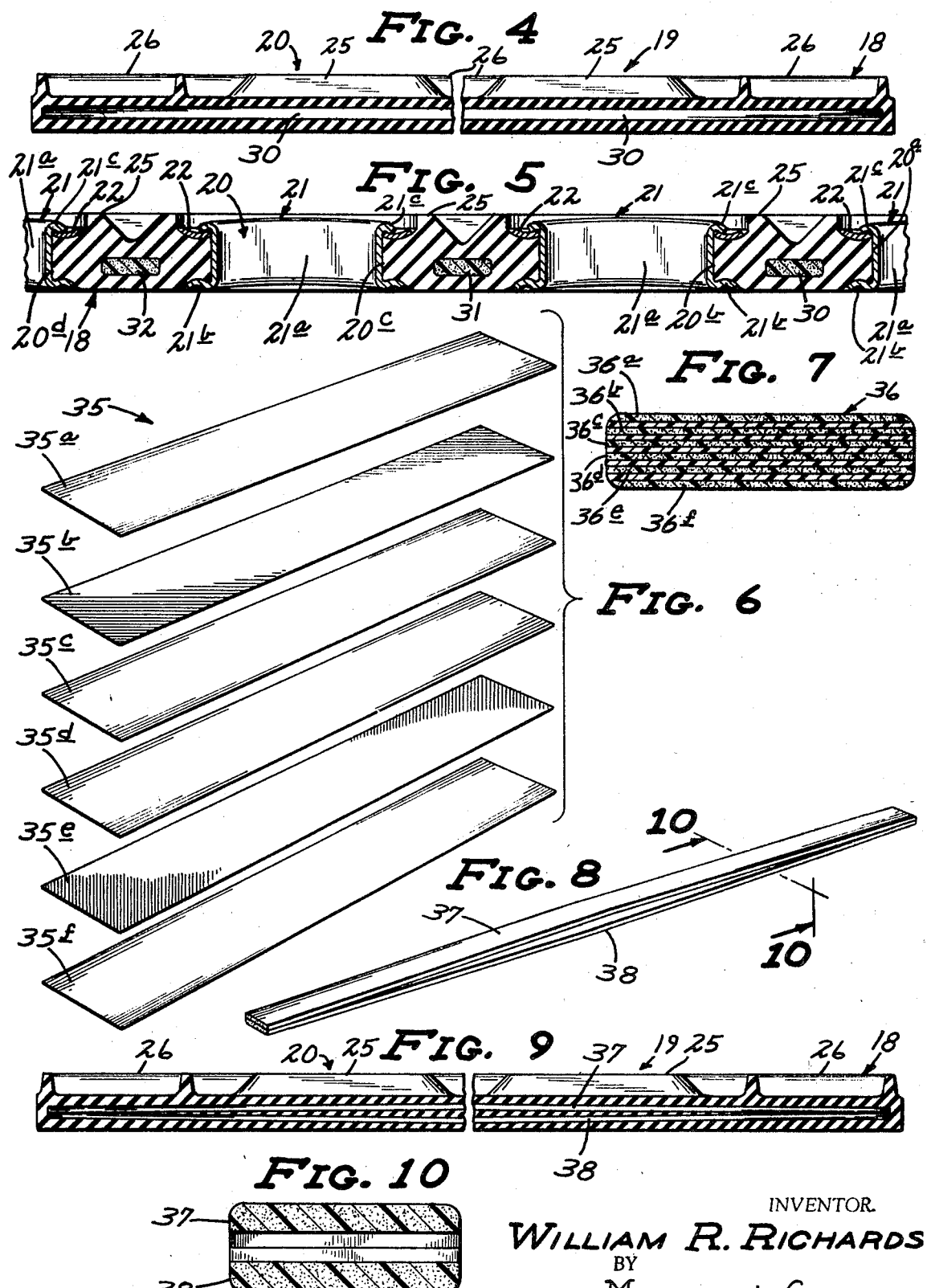

VEHICLE DRIVE TRACK STIFFENER

BACKGROUND OF THE INVENTION

1. Field of the Invention

This invention relates generally to the field of endless drive belt construction, but more specifically relates to the construction for a flexible drive track for a snowmobile, the drive track having a plurality of transverse fiber glass stiffeners incorporated as a part thereof.

2. Description of the Prior Art

The typical snowmobile utilizes an endless drive track or belt to carry a major portion of the vehicle weight and to drive the vehicle over the ground surface. Then endless belt is normally driven from its front end by one or more sprocket wheels and is supported at its opposite end by an idler sprocket system. The intermediate portion of the belt is supported by suitable bogie wheels or other supporting means.

Regardless of how the belt is constructed, it must have certain characteristics. The endless belt must be very flexible longitudinally so that it can freely follow the curvature of the drive and idler sprocket wheels. At the same time, however, the belt should be very rigid in a transverse direction so as to provide firm support for the vehicle. In any vehicle of this type, the drive track in effect lays down a temporary road over which the vehicle passes. If the greatest efficiency and speed of operation is to be obtained, the track must be as flat and rigid as possible during the time it is in contact with the ground. Since the belt cannot be made rigid longitudinally, it must be made relatively rigid in a transverse direction. If the belt were not made rigid in at least one direction, it would tend to bend upwardly around the bogie wheels so that only a small portion of the belt would stay in contact with the ground. Since the reason for using a belt is to distribute the weight of the vehicle over as wide an area as possible, a belt having no transverse rigidity at all would not function properly. By making the belt relatively rigid in a transverse direction, the load is more evenly distributed over the entire surface of the belt, this making the vehicle more stable and permitting it to operate efficiently over a wide variety of supporting surfaces.

Prior art snowmobiles have incorporated various devices for increasing the transverse rigidity of the drive belt. Perhaps the most commonly used type of prior art drive belt has been the flexible rubber or fabric belt having metal cleats riveted to the ground engaging surface of the belt. The cleats normally extend the full width of the belt and not only provide rigidity but also traction for the vehicle. In some cases, the drive sprocket teeth engage the metal cleats to drive the belt. A prior art belt construction of this general type is shown in the copending Allan E. Hetteen U.S. patent application, Ser. No. 793,705 filed Jan. 24, 1969, now U.S. Pat. No. 3,527,505. While these prior art metal cleats have provided sufficient rigidity, many problems have arisen in connection with their use. For one thing, they are very heavy and thus add considerable unnecessary weight to the vehicle. They are expensive to manufacture and difficult to properly attach to the belt. In actual practice, after considerable usage, they tend to break loose from the track and in so doing often cause considerable damage to both the track and the vehicle. Further, the metal cleats tend to be so unflexible that they break rather than flex if a solid object is encountered with considerable force.

In order to avoid these problems, attempts have been made in the past to incorporate the metal directly into the belt during manufacture of the belt. For example, the Bombardier U.S. Pat. No. 2,899,242 that issued Aug. 11, 1959 discloses a molded rubber belt having metal rods formed integrally therewith. The metal rods are placed in the belt prior to the forming or molding operation so that they are entirely surrounded and supported by the rubber belt. Thus, in the Bombardier belt, the metal rods do not directly contact the ground and no riveting or other such attachment method is necessary. In this manner, some of the problems encountered with the prior art exposed metal cleat were avoided by Bombardier.

With the Bombardier structure, however, the problem still exists that the metal rods are extremely stiff and do not readily flex in response to obstacles encountered by the vehicle. Since severe shocks are encountered quite frequently during normal snowmobile usage, it is extremely important that the belt be able to withstand such shocks without breaking or bending such rods. In the Bombardier structure, there is a tendency for the metal rods to break, bend, or to tear loose from the surrounding rubber material during use. The metal rods also add considerable undesirable weight to the vehicle.

In essence, it has been my experience that metal, whether in the form of cleats or rods, always fatigues and finally breaks. In many cases, the breakage of a single cleat or rod will require replacement of the entire belt.

SUMMARY OF THE INVENTION

The present invention overcomes the disadvantages of the prior art track stiffeners while retaining many of their basic advantages. In my invention, a plurality of fiberglass stiffeners are incorporated into the belt during the belt forming operation. The stiffeners extend transversely of the belt to virtually the full width of the belt and are spaced a predetermined distance apart to provide the necessary transverse rigidity. In one embodiment of my invention, the stiffeners each include a plurality of parallel monofilament fiberglass threads or fibers embedded in an epoxy resin binder. These unidirectional fiberglass stiffeners are preformed or extruded as a single unit and are then placed in the belt mold prior to the molding operation so that they are fully surrounded by the belt material. In another embodiment of my invention, the stiffeners are formed from a group of flat laminations that are cured together to form a solid mass. Each of the laminations comprises a plurality of parallel monofilament fiberglass threads embedded in a resin binder. In still another embodiment, a pair of flat fiberglass strips are secured together at their opposite ends and spaced apart intermediate their ends, with the material of the belt extending between the strips as well as over and under the strips so that a truss structure is formed by each of the stiffeners.

The fiberglass stiffeners of my invention are normally quite rigid so that they impart the necessary transverse rigidity to the drive belt. However, the fiberglass stiffeners are also flexible so that in response to shock, they will flex rather than break. The unidirectional fiberglass also has a very strong memory such that it will always return to the same position it was formed in. These stiffeners are also light in weight, inexpensive to manufacture and easy to incorporate into the belt during the belt forming operation. Once incorporated into the belt, these stiffeners are virtually unbreakable, thus adding considerable life to the snowmobile drive belt.

BRIEF DESCRIPTION OF THE DRAWINGS

FIG. 1 is a view in side elevation of a portion of a snowmobile, including a frame and an endless drive track mounted thereon; portions thereof shown in section;

FIG. 2 is a plan view of a portion of the ground engaging run of the drive track;

FIG. 3 is a view in perspective of a fiberglass stiffener, portions thereof being broken away;

FIG. 4 is an enlarged sectional view of the drive track and a stiffener taken along line 4—4 of FIG. 2;

FIG. 5 is an enlarged sectional view of the drive track, the sprocket engaging openings and a plurality of fiberglass stiffeners, taken along line 5—5 of FIG. 2;

FIG. 6 is an exploded view, in perspective, of a laminated fiberglass stiffener;

FIG. 7 is a greatly enlarged cross-sectional view of a laminated fiberglass stiffener of the type shown in FIG. 6;

FIG. 8 is a view in perspective of another form of fiberglass stiffener forming a truss structure;

FIG. 9 is a view similar to that of FIG. 4 but incorporating the stiffener shown in FIG. 8; and FIG. 10 is an enlarged sectional view taken along line 10—10 of FIG. 8.

DESCRIPTION OF THE PREFERRED EMBODIMENTS

Referring now to the drawings, wherein like reference numerals will be used throughout the several views to identify like elements of the invention, there is disclosed in FIG. 1 a portion of a snowmobile frame 10 on which is mounted a front drive sprocket wheel 11 having a plurality of sprocket teeth 12, a rear idler sprocket wheel 13 having a plurality of sprocket teeth 14, and a plurality of spring-loaded bogie wheel assemblies 15, 16 and 17. Mounted beneath and partially within the confines of frame 10 is an endless drive track or belt 18. Drive track 18 is provided with a first series 19 and a second series 20 of sprocket engaging openings formed at spaced intervals. The first series 19 and the second series 20 are formed along the opposite edges of the drive track 18 and are parallel to each other. The individual openings in each of the two series 19 and 20 may be designated by the letters a, b, c, etc.

Each of the belt openings is generally rectangular and the openings in each series are spaced so that they mesh with the associated drive sprocket wheel and idler sprocket wheel. Although only one set of sprocket wheels is shown in FIG. 1, it is evident that another set would be required if the type of belt shown in FIG. 2 is used. For the purpose of reinforcing the drive belt openings, I provide a plurality of grommetlike reinforcing and wear elements 21, one for each of the openings. Each of the elements 21 comprises a tubular sleeve portion 21a of a shape and size to snugly fit one of the openings in the series 19 or 20, an inner marginal flange 21b that projects generally radially outwardly from one end of the sleeve portion 21a and which engages the inner surface of the belt 18, and an outer marginal clamping flange 21c which overlies the outer surface of the drive track 18 around the sprocket tooth engaging opening. A clamping washer 22 underlies the clamping flange 21c and is anchored in clamping engagement with the outer belt surface by the clamping flange 21c. The full construction and operation of these reinforcing and wear elements 21 are fully described in my copending patent application entitled "Snowmobile Track," Ser. No. 767,641 that was filed Oct. 15, 1968. Drive track 18 is preferably made from fabric reinforced rubber. The track 18 is molded or formed as a single unit so that no seams are present. The bottom ground engaging surface of drive track 18, as shown in FIG. 2, is also provided with a tread pattern that both protects the wear elements 21 and provides traction for the vehicle. These treads include ridges 25 surround each opening and ribs 26 extending laterally outwardly from the ridges 25 toward opposite side edges of the drive track 18. Additional tread forming or traction elements may be utilized but since they are not important to the present invention, they are not identified.

As shown in FIG. 2, the openings in each of the series 19 and 20 are equally spaced from adjacent openings, and each opening in one series is located directly across the belt from a corresponding opening in the other series. Thus, openings 19a and 19b lie directly across from openings 20a and 20b. Since the openings are spaced apart, a portion of the molded belt 18 extends between openings 19a and 19b, and another portion extends between openings 20a and 20b. These two belt portions also lie directly across from each other.

Referring now to FIG. 2, there is shown in dotted lines fiberglass stiffeners 30, 31, 33, etc., that extend transversely across the belt to slightly less than the full width thereof, between the inner and outer surfaces thereof. The construction of a single stiffener 30 is shown in FIG. 3. Stiffener 30 is molded, extruded or otherwise formed from a plurality of parallel monofilament fiberglass threads that are embedded in a resin binder. An important feature of the stiffener 30 is that the fiberglass threads or fibers extend longitudinally from one end to the other and are thus unidirectional. In actual practice, the stiffener 30 is approximately one-eighth inch thick and one-half inch wide. Stiffeners 30—33, etc. as shown in FIGS. 2, 3 and 4, are positioned perpendicular to the longitudinal axis of the belt 18. Stiffener 30 extends across the belt between a pair of openings 19a and 19b, and a corresponding pair of openings 20a and 20b in the other series. Preferably, the stiffener 30 is positioned halfway between the two adjacent openings on each side of the belt. Stiffener 30 imparts transverse rigidity to the belt but at the same time it is sufficiently flexible to bend upon impact with a solid object. Further, stiffener 30 has a memory such that it always returns to the normal flat position.

As best shown in FIGS. 2, 5, succeeding stiffeners 31, 32, 33, etc. are mounted in the belt so that a single stiffener is positioned between each pair of adjoining openings 21. All of the stiffeners are constructed in the same manner as that previously described for stiffener 30, all lie in parallel to each other, and all are positioned at equally spaced intervals.

The fiberglass stiffeners 30—33, etc. are incorporated into the belt during the belt molding or forming process. Preferably, the stiffeners 30—33, etc. are premolded and are provided with rounded corners as shown in FIG. 3 so that flexing of the belt will not tend to cause the corners and edges thereof to cut the belt material. As best shown in FIG. 5, a portion of the belt extends over the stiffener and a portion extends under it. Therefore, the stiffener is actually an integral part of the belt and is protected by the belt from contact with the ground surface or from contact with the sprocket wheel teeth. The stiffeners tend to hold the belt flat in a transverse direction but of course do not prevent flexing of the belt in a longitudinal direction as it passes over the sprocket wheels. The stiffeners add very little weight to the belt and they are very easy to insert during manufacture of the belt itself. Since the stiffeners are inherently flexible, there is little tendency for them to break during usage of the belt and there are no rivets or other connections to break. For these reasons, the present invention offers a great improvement in performance as compared to belts using prior art stiffening methods.

Referring now to FIGS. 6 and 7, there is disclosed another embodiment of fiberglass stiffener for use as previously described. This type of stiffener comprises a group of flat laminations cured together to form a solid mass. Each of the laminations comprises a large number of parallel monofilament fiber glass threads embedded in an epoxy resin binder. In FIG. 6, the individual laminations of a stiffener 35 are identified by the letters a, b, c, d, e and f. The number of laminations is not critical however, in FIG. 6, six laminations, a—f, are shown. In FIG. 7 a stiffener 36 having six layers or laminations, a—f, is shown with five layers of epoxy resin interposed therebetween. When the laminations are cured together, a solid mass is formed and the resulting stiffener is used in the same manner as that previously described for stiffeners 30—33. The laminated structure gives greater rigidity than the single molded structure of stiffener 30, and also has a better memory.

In construction of the laminated stiffener 35 or 36, each lamination may utilize parallel fiber glass threads that extend from one end to the other, if desired. On the other hand, a stronger structure will result if the threads in one lamination are skewed with respect to the threads in another adjoining lamination. For example, referring to FIG. 6, it is noted that the threads in lamination 35a extend from one end to the other thereof and lie in parallel with the side edges thereof. The threads in lamination 35b, however, lie at almost a 45° angle with respect to the side edges thereof. The threads of lamination 35e also lie at an angle with respect to the edges but lie at right angles with respect to the threads in lamination 35b. By constructing the stiffener in this manner, as shown in both FIGS. 6 and 7, the strength and toughness of the resulting stiffener is much greater than would be the case where all of the threads in the stiffener run in the same direction.

Another approach to constructing the stiffener is shown in FIGS. 8, 9 and 10. FIG. 8 disclosed a stiffener comprising a pair of flat fiber glass strips 37 and 38 secured together at their opposite ends and spaced apart intermediate their ends. Each of the strips 37 and 38 be constructed as a single unit similar to stiffener 30 or may be constructed as a laminated stiffener in the manner of stiffeners 35 and 36. In any event, however, the two strips 37 and 38 are secured together for a short distance at their opposite ends but are bowed apart intermediate their ends as shown in the drawings. During construction of the belt 18, the belt material, normally rubber, is not only positioned on opposite sides of the strips 37 and 38 but is also placed between them. When the rubber belt is vulcanized, the stiffener is embedded within the belt as previously described, but with the rubber belt material also extending between the two strips 37 and 38. A truss structure is thus formed by the strips 37 and 38 that strongly resists bending from its normal position, and that will quickly return to its normal position if it is flexed. Again, a plurality of these stiffeners, each comprising a pair of flat strips 37 and 38, will be molded into the belt as shown and described previously with respect to stiffeners 30—33 etc. In all cases, the outer edges and corners of the stiffeners are rounded off to avoid causing damage to the belt material during normal usage thereof.

The particular means of bonding the monofilament fiberglass threads together is not critical to my invention. Epoxy resin is normally used but other bonding materials could be used if they provided similar properties. Further, the stiffeners are normally formed in advance of the belt forming operation so that the belt molding or vulcanizing operation has no affect on the properties of the stiffeners. However, I also intend to cover a stiffener of the type that would be placed in the belt in an uncured condition, and thereafter cured at the same time that the belt material is cured. The resulting structure would be identical, but the method of constructing it would be slightly different.

Also, I have disclosed a belt having two series of sprocket wheel teeth engaging openings. As shown in my copending application entitled "Snowmobile Track," Ser. No. 767,641, however, it is common practice in the snowmobile industry to utilize a belt having only a single row or series of openings formed therein. In that type of track, the series of openings lies along the longitudinal center of the belt so as to engage a single drive sprocket wheel. Since that type of belt also requires means of providing transverse rigidity, I intend that the same stiffeners be used in that type of belt. In such case, the stiffeners would again extend between the adjacent openings to basically the full width of the belt. Actually, my invention is applicable to any type of flexible molded drive belt, regardless of how it is driven. My inventive approach to imparting transverse rigidity to a flexible drive belt is applicable to a wide variety of belt constructions and is not limited to a belt having sprocket teeth engaging openings. Therefore, my invention should not be limited to the details disclosed in the specification and drawings, but only by the scope of the appended claims.

What I claim is:

1. In an endless, flexible vehicle driven belt with an inner surface and a ground engaging outer surface, the improvement comprising means to impart transverse rigidity to said belt, said means including a plurality of spaced, fiber glass stiffeners extending transversely of said belt between the inner and outer surfaces thereof, said stiffeners each comprising a plurality of parallel monofilament fiberglass threads embedded in a resin binder.

2. In a vehicle drive track comprising an endless rubber belt with an inner surface, a ground engaging outer surface and a first and second series of longitudinally spaced openings therethrough for engagement with the teeth of a pair of spaced drive sprocket wheels, the improvement comprising means to impart transverse rigidity to said belt, said means including a plurality of flat, fiber glass stiffeners molded into said belt so as to be completely surrounded by said rubber belt, each of said stiffeners extending transversely of said belt between a corresponding pair of openings in each of said first and second series, to generally the full width of the belt.

3. In an endless, flexible vehicle driven belt with an inner surface and a ground engaging outer surface, the improvement comprising means to impart transverse rigidity to said belt, said means including a plurality of spaced, fiberglass stiffeners extending transversely of said belt between the inner and outer surfaces thereof, said stiffeners each comprising a group of flat laminations cured together to form a solid mass, each of said laminations comprising a plurality of parallel monofilament fiberglass threads embedded in a resin binder.

4. The apparatus of claim 3 wherein said threads in one lamination are skewed with respect to the threads in an adjacent lamination.

5. In an endless, flexible vehicle driven belt with an inner surface and a ground engaging outer surface, the improvement comprising means to impart transverse rigidity to said belt, said means including a plurality of spaced, fiberglass stiffeners extending transversely of said belt between the inner and outer surfaces thereof, said stiffeners each being flat and having a generally rectangular cross section with the corners and edges thereof being rounded off to reduce wear on the adjoining belt material.

6. In an endless, flexible vehicle driven belt with an inner surface and a ground engaging outer surface, the improvement comprising means to impart transverse rigidity to said belt, said means including a plurality of spaced, fiber glass stiffeners extending transversely of said belt between the inner and outer surfaces thereof, said stiffeners each comprising a pair of flat fiber glass strips secured together at their opposite ends and spaced apart intermediate said ends, the material of said belt extending between said strips as well as over and under said strips, whereby a truss structure is formed by each of said stiffeners.